United States Patent

Shape

[15] 3,698,736
[45] Oct. 17, 1972

[54] COMBINED HAND AND TOWING TRUCKS

[72] Inventor: Robert C. Shape, Warren, Ohio

[73] Assignee: Warren Steel Specialties Corporation, Warren, Ohio

[22] Filed: Dec. 30, 1970

[21] Appl. No.: 102,598

[52] U.S. Cl. .................... 280/46, 214/370, 254/8 R, 280/47.18, 280/47.29
[51] Int. Cl. ............................................. B62b 1/04
[58] Field of Search....... 280/46, 47.17, 47.18, 47.19, 280/47.24, 47.27, 47.28, 47.29, DIG. 2; 214/370; 254/8 R, 8 B, 8 C

[56] References Cited

UNITED STATES PATENTS

| 3,083,950 | 4/1963 | Detwieler | 280/DIG. 2 |
|---|---|---|---|
| 2,497,440 | 2/1950 | Denny | 280/47.29 |
| 2,472,670 | 6/1949 | McFarland | 280/47.18 X |
| 2,723,130 | 11/1955 | Andrews | 280/47.19 |
| 3,003,654 | 10/1961 | Pelto | 214/370 |
| 1,635,198 | 7/1927 | Turner | 280/46 |
| 2,236,809 | 4/1941 | Turner | 280/46 |

FOREIGN PATENTS OR APPLICATIONS

| 584,814 | 1/1947 | Great Britain | 280/47.24 |
|---|---|---|---|
| 1,091,438 | 10/1960 | Germany | 280/46 |
| 644,108 | 10/1950 | Great Britain | 280/47.24 |
| 624,195 | 8/1961 | Italy | 280/46 |

Primary Examiner—Benjamin Hersh
Assistant Examiner—Leslie J. Paperner
Attorney—Michael Williams

[57] ABSTRACT

A combined hand and towing truck comprising a handle portion, wheels connected to the lower end of the handle portion for rolling along a ground surface, the handle portion being swingable through an arc having for its center the axis of the wheels, and means swingable with the handle portion to present a towing connection when the handle portion is in one throwover position in said arc, and to present a hand truck platform when the handle portion is in another throwover position in said arc.

5 Claims, 10 Drawing Figures

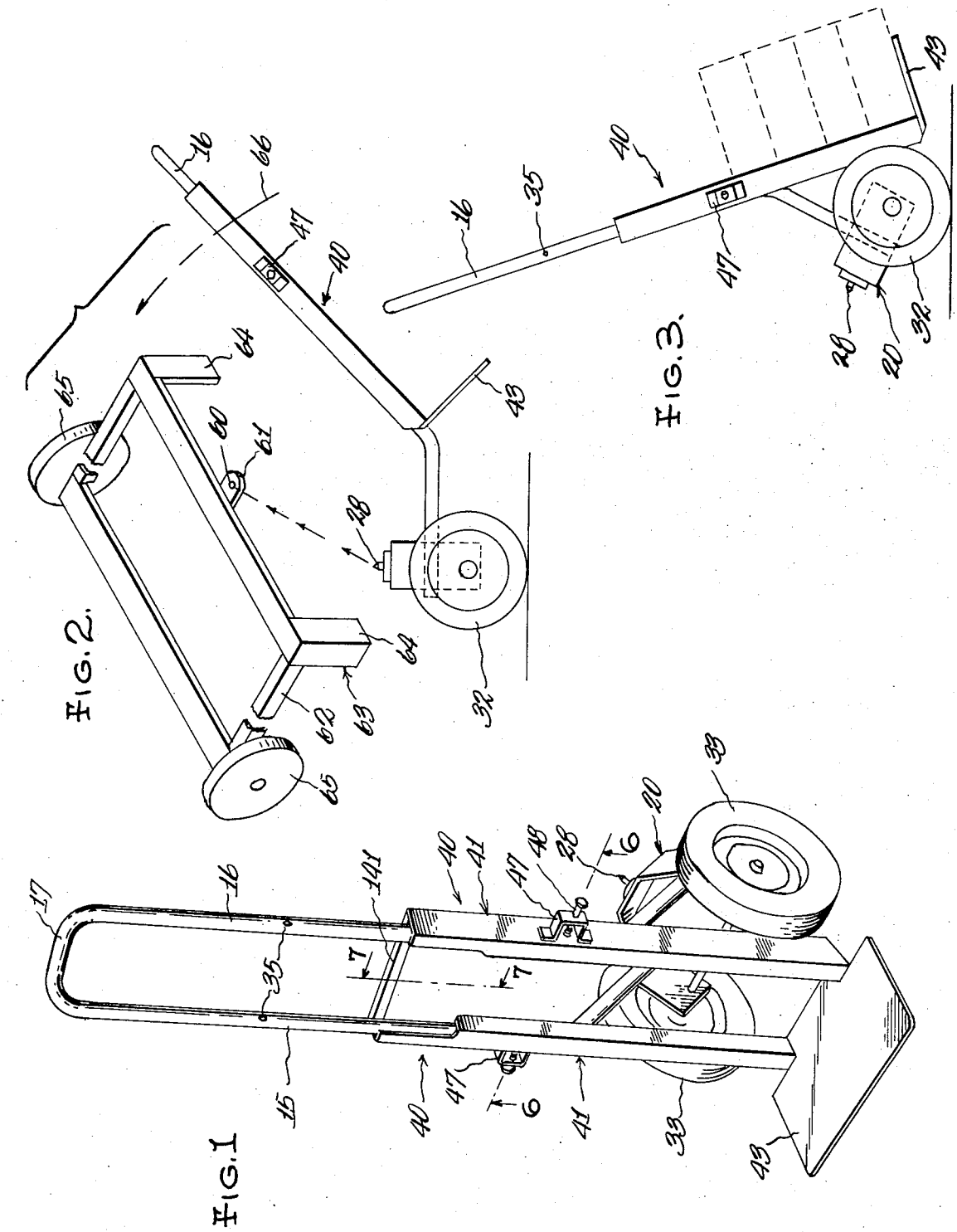

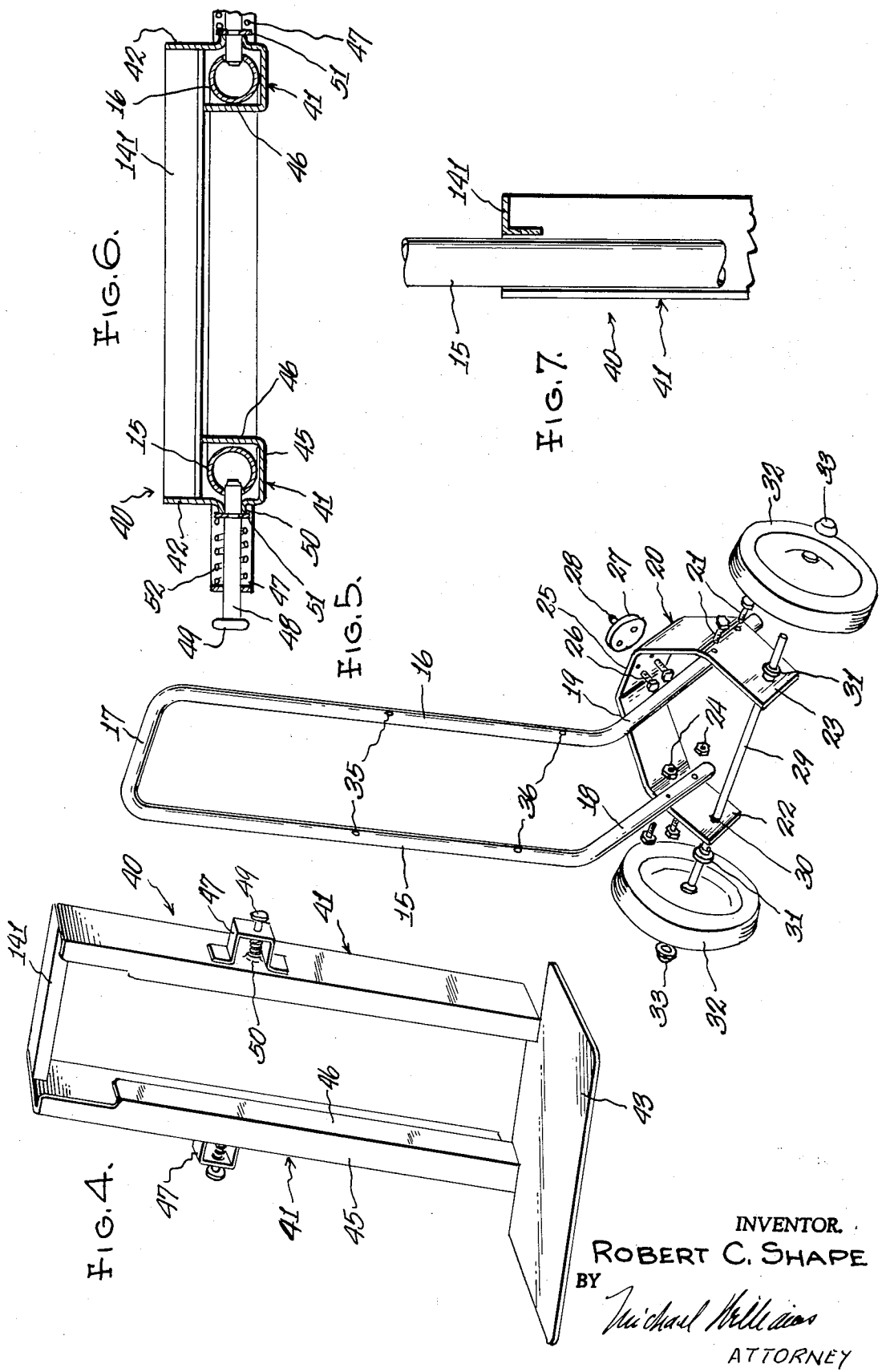

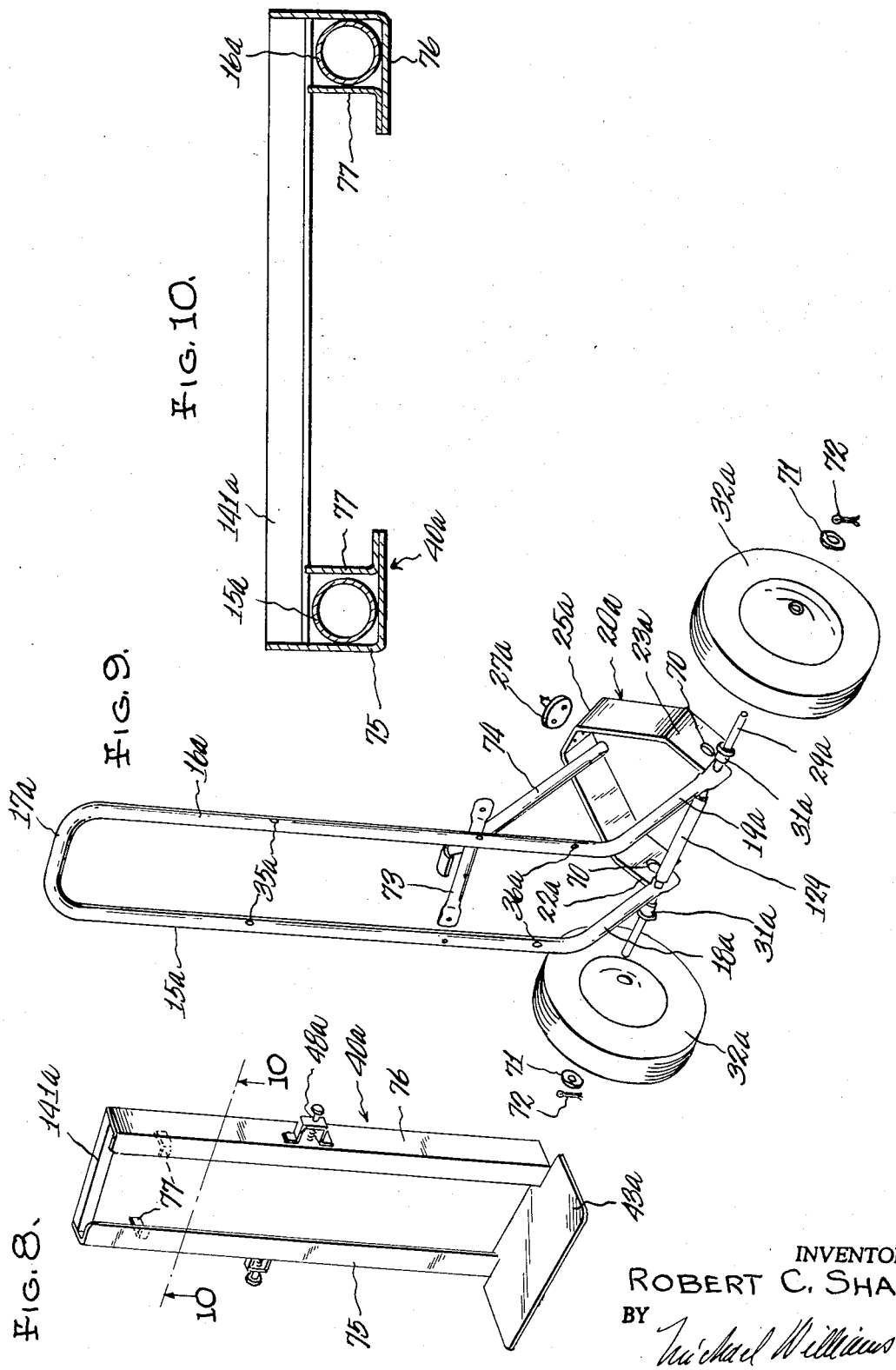

COMBINED HAND AND TOWING TRUCKS

BACKGROUND AND SUMMARY

My improved combined hand and towing truck is particularly suitable for use in automobile service stations, although it will be appreciated that many other uses may be found, such for example, in industrial plants and the like.

The modern service stations not only sell gasoline but also sell tires, batteries and other automobile requirements. Tires, particularly, are displayed on racks which have to be moved from the service building in the morning and returned to the building in the evening, and these racks include a framework on wheels to facilitate movement of the display.

Towing trucks, somewhat like that shown in FIG. 5 of this application, have been used to tow the relatively heavy display racks, but since such trucks had only one use, the service station operators were hesitant to make an investment in a limited use item. Since other bulky and heavy objects are also required to be moved in service station operations, an ordinary hand truck was desirable, but this further increased the required investment.

My invention combines the utility of a towing truck and a hand truck in one vehicle and at only a slightly greater cost than that of either standard item, and therefore, it is the principal object of my invention to provide new and novel constructions of this type.

DESCRIPTION OF THE DRAWINGS

In the drawings accompanying this description and forming a part of this specification, there are shown, for purpose of illustration, embodiments which my invention may assume, and in these drawings:

FIG. 1 is a perspective view of a combined hand and towing truck, showing an embodiment of my invention in position for use as a hand truck, FIG. 2 is a smaller scale, side elevational view of the structure shown in FIG. 1, showing the embodiment in position for use as a towing truck, in combination with a fragmentary perspective representation of a wheeled rack to be towed, FIG. 3 shows the embodiment after it has been changed from the position of FIG. 2 and is in position as a hand truck, FIGS. 4 and 5 show parts of the truck in disassembled relation, the construction being similar to that of FIG. 1 but of slightly different proportions, FIGS. 6 and 7 are enlarged, fragmentary sectional views corresponding respectively to the lines 6—6 and 7—7 of FIG. 1, FIGS. 8 and 9 show parts of a truck in disassembled relation, the truck therein shown being of slightly different construction then that shown in FIGS. 1 through 7, and FIG. 10 is an enlarged sectional view corresponding to the line 10—10 of FIG. 8, but with corresponding parts of FIG. 9 in operative position.

DESCRIPTION OF THE PREFERRED EMBODIMENT

With reference to FIGS. 1 through 7 of the drawings, the embodiment therein disclosed comprises a generally rectilinear upper handle portion formed of steel tubing and providing spaced upright legs 15–16 joined at the top by an integral cross-piece 17. The lower ends of the legs are at an angle or offset with respect to the upright portions, as seen at 18–19 in FIG. 5, so as to extend to one side of the general longitudinal plane within which upper portion of the handle legs 15, 16 are disposed.

A towing connection formed from an inverted U-shaped metal bridge member 20 is attached to the leg portions 18–19, and preferably the attachment is made by bolts 21 passing through aligned openings in the leg portions 18–19 and the respective legs 22–23 of the bridge member, and nuts 24 complete the connection. This method of attachment is preferred since it lends itself to economically knockdown shipment of the improved truck. Secured to the bight 25 of the bridge member, as by bolts 26, is a plate 27 which carries a projecting pin 28.

An axle 29 extends through openings in the legs 22, 23 of the bridge member 20 and preferably is secured to the latter, as by tack welds 30. Spacer sleeves 31 are disposed on the axle, outwardly of the legs 22, 23, to hold the hubs of rubber-tired wheels 32,32 spaced from the legs. An acorn cap 33 is pressed on each end of the axle 29 to hold the wheels in place. As seen in FIG. 5, the upright legs 15,16 are provided with spaced sets of openings 35,36, for a purpose to appear.

The embodiment of the invention is completed by use of a generally rectilinear load frame 40, seen best in FIG. 4. This frame is formed of a pair of elongated channel members 41,41 of identical cross-section as seen in FIG. 6. A strut 141, of angle cross-section, is welded across the wide, outwardly directed legs 42 of the channel members at the top of the latter, and a platform 43 is welded across the lower ends of the channel members.

The frame 40 is assembled with the handle portion of the track by disposing the lower ends of the channel members over the upright legs 15,16, with the strut above the cross-piece 17, and sliding the frame 40 downwardly along the legs 15,16 so that the latter are confined in the space between the strut 41 and the bight legs 45 of the channel member. Confinement of the legs 15,16 between the long legs 42 and the short legs 46 of the channel members hold the frame 40 and the legs against lateral separation.

Latch means are provided to hold the load frame 40 in a selected one of two positions on the legs 15,16 and in the present embodiment each channel leg 42 has a U-shaped metal strap 47 spot welded thereto. A pin 48 extends through an opening in the bight of each strap 47 and is formed with a headed outer end 49 for manipulation purposes. Each channel leg 42 is formed with an opening encircled by an outward extrusion 50 of the metal to provide a stop for a split washer 51 seated in an annular groove in a respective pin 48. A compression spring 52 is interposed between the washer 51 and the inner surface of the bight of the strap 47 and urges the pin 48 in a direction to extend through the opening in the channel leg 42 and into a selected one of the pairs of openings 35,36 in the legs 15,16.

FIGS. 1 and 3 show the position of the frame when the latch pins 48 are engaged in respective ones of the lower pair of openings 36,36 to hold the frame 40 in position wherein the platform 43 is closely adjacent the ground surface for hand truck operations, and with the platform extending on the opposite side of the handle longitudinal plane from the towing connection.

FIG. 2 shows the position of the frame 40 when the latch pins 48 are engaged in respective ones of the upper pair of openings 35,35 to space the platform from the ground surface. In FIG. 2, the upright legs 15,16 are to the right of the vertical in a first throwover position so as to dispose the towing assembly in position for towing operations. It will be noted in FIG. 2 that the coupling pin 28 is disposed upright in position for engagement in an opening 60 in a lug 61 welded to the frame 62 of the vehicle 63 to be towed. The vehicle 63 may take any appropriate form, and in use for supporting tires in display manner may have uprights (not shown) to hold the tires in position. Normally, the frame 62 has legs 64,64 at the end near the lug 61, and wheels 65,65 at the opposite end. My improved truck may be rolled to the vehicle 63 and slightly tilted to bring the coupling pin 28 under the lug 61, in line with the opening 60. The truck is then titled back to position shown in FIG. 2, wherein the pin 28 seats in opening 60 and the plate engages under the lug 61 and lifts that end of the frame 62 so that the legs 64 are clear of the ground surface. The user may then push or pull on the truck to move the vehicle 63 to desired position.

After the embodiment has been used for towing purposes, it may be disconnected from the vehicle 63 and may simply be converted to a hand truck by moving the handle portion through the arc 66 shown in FIG. 2 into a second throwover position. The arc 66 has its center at the axle of the wheels 32 and when the handle portion is swung in the arc from the position shown in FIG. 2 to the position shown in FIG. 3, the towing pin 28 will be positioned out of the way and the platform 43 will be available for hand truck operations, preferably after the frame 40 has been shifted to its lower position with the latch pins 48 seated in the lower pair of openings 36 in the legs 15,16.

OTHER EMBODIMENT

The embodiment disclosed in FIGS. 8 through 10 is substantially similar to that previously described and corresponding parts will be identified with the same reference numeral with the suffix *a*.

As before the handle portion is formed by metal tubing providing upright legs 15a, 16a. In this embodiment, the bridge member 20a has holes 70 in its legs 22a, 23a to freely pass the axle 29a for the wheels 32a. The extremity of the lower angular portions 18a, 19a of the handle legs are flattened and formed with holes to freely pass the axle 29a. Spacer bushings 31a are placed on the axle to space the hubs of the wheels from the bridge member legs. The wheels are freely rotatable on the axle, and a washer 71 and cotter pin 72 holds each wheel to the respective end of the axle. A cross-brace 73 has its opposite ends bolted to the legs 15a, 16a and a diagonal brace 74 is bolted at one end to the midpoint of the brace 73 and at its other end to the bight 25a of the bridge member by the same bolts that bolt the plate 27a in position. A piece of tubing 129 may be disposed on the axle, for free rotation thereon, and provides a rest for a workman's shoe to assist in hand truck operations.

The frame 40a is in this embodiment provided with spaced legs 75,76 which are of angle formation, as best seen in FIG. 10. An angle cross-piece 141a is welded across the upper portion of the legs 75,76, and a platform 43a is welded across the lower portion of the legs. Small angle pieces 77,77 are spot-welded to the legs 75,76 in the position shown in FIGS. 8 and 10, and provide stops which engage the cross-brace 73 when the frame 40a is moved toward its lower position to prevent the fingers of a user from being pinched between the cross-piece 17a of the handle and the brace 73, should the latch pins 48a fail to seat in the lower openings 36a.

I claim:

1. A throwover dual purpose hand truck comprising:
   a substantially rectilinear handle upper portion, and a lower portion offset to one side of the longitudinal plane of said handle upper portion,
   a wheel carrying axle cooperatively associated with said handle lower portion,
   a towing connection cooperatively associated with said handle offset portion and offset further from said handle longitudinal plane in the same direction as said handle offset portion,
   a substantially rectilinear load frame having an outwardly extending platform, and,
   means connecting said load frame to said handle upper portion for sliding movement between,
   1. a first selectable position with the lower portion of said load frame extending freely from said handle upper portion in the longitudinal plane thereof and adjacent said wheels with said platform extending outwardly on the opposite side of said plane adjacent the floor thereby to permit wheeling of a load thereon with said hand truck in a first throwover position, and,
   2. a second selectable position wherein said load frame is substantially fully received on said handle upper portion and retracted from a position adjacent said wheels, thereby to permit towing of loads by said towing connection with said hand truck in a second throwover position.

2. The construction of claim 1 wherein said load frame is formed from sheet metal.

3. The construction according to claim 1 wherein said towering connection includes an inverted U-shaped bridge member having its legs connected to said axle with a connector carried by the bight of said bridge member.

4. The construction according to claim 1 wherein said frame is removably connected to said handle upper portion, whereby it may be removed from said handle upper portion so that only a towing truck remains.

5. The construction according to claim 1 wherein said frame includes leg portions lying along said handle upper portion, each of said leg portions having a spring-pressed detent to fit in either one of two holes formed at spaced locations on said handle upper portion.

* * * * *